(12) United States Patent
Qu et al.

(10) Patent No.: US 7,704,927 B2
(45) Date of Patent: Apr. 27, 2010

(54) METHOD OF ACID FRACTURING A SANDSTONE FORMATION

(75) Inventors: Qi Qu, Spring, TX (US); Xiaolan Wang, Spring, TX (US)

(73) Assignee: BJ Services Company, Houston, TX (US)

(*) Notice: Subject to any disclaimer, the term of this patent is extended or adjusted under 35 U.S.C. 154(b) by 176 days.

(21) Appl. No.: 12/115,603

(22) Filed: May 6, 2008

(65) Prior Publication Data

US 2009/0281005 A1    Nov. 12, 2009

(51) Int. Cl.
*C09K 8/26* (2006.01)
*C09K 8/72* (2006.01)
*E21B 43/28* (2006.01)

(52) U.S. Cl. .............. 507/255; 166/305.1; 166/307; 166/308.1; 166/308.3; 507/252; 507/276; 507/277; 516/53

(58) Field of Classification Search .............. 507/255, 507/252, 276, 277; 166/305.1, 307, 308.1, 166/308.3; 516/53
See application file for complete search history.

(56) References Cited

U.S. PATENT DOCUMENTS

| 6,443,230 | B1 | 9/2002 | Boles et al. |
| 7,205,264 | B2 | 4/2007 | Boles |
| 7,303,018 | B2 | 12/2007 | Cawiezel et al. |
| 2005/0137095 | A1 | 6/2005 | Cawiezel et al. |
| 2008/0114053 | A1* | 5/2008 | Tsunoda et al. ............ 514/423 |

FOREIGN PATENT DOCUMENTS

WO    WO 2006/030383 A2    3/2006

* cited by examiner

*Primary Examiner*—Timothy J. Kugel
(74) *Attorney, Agent, or Firm*—Howrey LLP

(57) ABSTRACT

Methods and compositions useful in acidizing a subterranean formation with an oil-in-water emulsion that includes a sulfonate ester, a fluoride salt, a proppant, and water. The reaction of the ester and fluoride salt is delayed so that hydrofluoric acid is produced in-situ.

20 Claims, 1 Drawing Sheet

METHOD OF ACID FRACTURING A SANDSTONE FORMATION

BACKGROUND OF THE INVENTION

1. Field of the Invention

The present invention relates to the field of stimulating sandstone formations of oil and gas wells by use of an acid fracturing fluid containing a sulfonate ester.

2. Description of the Related Art

Acid fracturing is a well-stimulation operation in which acid is forced into formation at a pressure above the formation-fracturing pressure to cause the formation to crack open. The acid reacts with the fracture faces in a non-uniform pattern (etching) to form conductive channels that remain open without a propping agent after the fracture closes. While acid fracturing is usually applicable for carbonate formations, acid fracturing in sandstone formations is not a common practice due to the low rock solubility of mud acid.

For acid fracturing, it is desirable that the generated fractures remain open when the fracture pressure is released. When pumping acid with proppant at the same time, due to the tendency for the acid to react evenly with the fracture face and the fast reaction rate between the acid and the fracture face, there is a good chance that opposing fracturing faces match up when the fracturing pressure is released. The created disparities in flow paths through fast reaction between the acid and the fracture face could result in a narrower fracture width if the propping particles are embedded in the fracture faces that have been etched by the acid. When this occurs, the flow channels are narrowed, which results in reduced productivity.

A need exists for methods and compositions that are useful in effectively acid fracturing sandstone formations to enable efficient production of hydrocarbons from such sandstone formations.

SUMMARY OF THE INVENTION

In view of the foregoing, compositions and methods of acid fracturing a subterranean sandstone formation of a well to stimulate production of hydrocarbons are provided as embodiments of the present invention. In one embodiment, the method includes injecting an acid fracturing fluid into the sandstone formation at a pressure sufficient to form fractures within the formation. In an aspect, the acid fracturing fluid includes a sulfonate ester, a fluoride salt, a proppant, and water. Once the acid fracturing fluid is within the formation, the sulfonate ester is hydrolyzed to produce sulfonic acid that is then reacted with the fluoride salt subsequent to injection of the acid fracturing fluid into the formation to produce hydrofluoric acid in situ. In an aspect, the fluoride salt can include a bifluoride salt.

As another embodiment of the present invention, a method for stimulating a sandstone formation penetrated by a well with an oil-in-water emulsion is provided. In this embodiment, the method includes introducing into the well the oil-in-water emulsion that, subsequent to introduction into the well, produces hydrofluoric acid in-situ in the formation. As in other embodiments, the oil-in-water emulsion includes a sulfonate ester, a fluoride salt, a proppant, and water.

Besides the method embodiments, compositions useful in stimulating sandstone formations are also provided as embodiments of the present invention. In one embodiment, a stable oil-in-water emulsion acid fracturing fluid composition comprising about 1 vol. % to about 20 vol. % sulfonate ester, about 1 pound-about 400 pounds fluoride salt per 1000 gallons acid fracturing fluid, partial monolayers of proppant (20/40 mesh) at a loading of about 0.01 lb/ft$^2$-about 0.4 lb/ft$^2$, and about 60 vol. %-about 99 vol. % water is provided.

Figure 1:
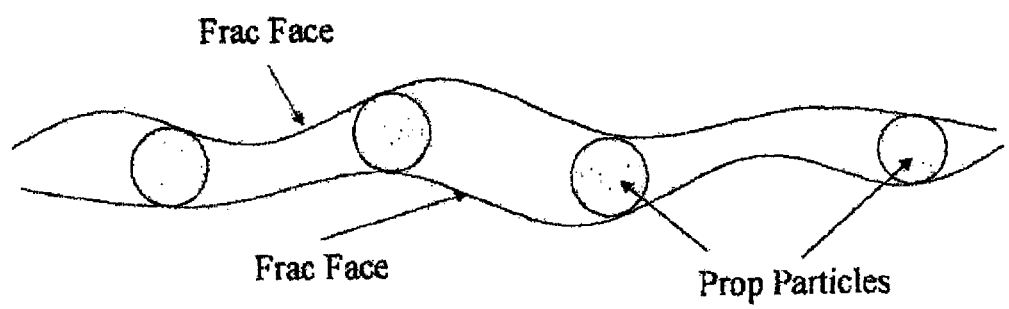
FIG. 1 illustrates the placement of proppant material in formations in accordance with prior art methods.

While the invention is susceptible to various modifications and alternative forms, specific embodiments have been shown by way of example in the drawings and will be described in detail herein. However, it should be understood that the invention is not intended to be limited to the particular forms disclosed. Rather, the intention is to cover all modifications, equivalents and alternatives falling within the spirit and scope of the invention as defined by the appended claims.

DESCRIPTION OF ILLUSTRATIVE EMBODIMENTS

Illustrative embodiments of the invention are described below as they might be employed in the operation and in the treatment of well bores. In the interest of clarity, not all features of an actual implementation are described in this specification. It will of course be appreciated that in the development of any such actual embodiment, numerous implementation-specific decisions must be made to achieve the developers' specific goals, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments of the invention will become apparent from consideration of the following description.

While compositions and methods are described in terms of "comprising" various components or steps (interpreted as meaning "including, but not limited to"), the compositions and methods can also "consist essentially of" or "consist of" the various components and steps, such terminology should be interpreted as defining essentially closed-member groups.

As an embodiment of the present invention, a method of acid fracturing a subterranean sandstone formation of a well to stimulate production of hydrocarbons is provided. In this embodiment, the method includes injecting an acid fracturing fluid into the sandstone formation at a pressure sufficient to form fractures within the formation. In an aspect, the acid fracturing fluid comprises a sulfonate ester, a fluoride salt, a proppant, and water. Once the acid fracturing fluid is located within the formation, the sulfonate ester is hydrolyzed to produce sulfonic acid that reacts with the fluoride salt subsequent to injection of the acid fracturing fluid into the formation to produce hydrofluoric acid in situ.

Besides enabling use of stronger acids in acid fracturing sandstone formations, the compositions and methods of the present invention optimize placement of a partial monolayer of proppant in the formation while creating favorable fracturing surface etching so that enlarged flow channels are generated in the sandstone formation. With the optimized placement of the proppant material, the hydrofluoric acid is prohibited from contacting spots on the fractures that are in contact with the proppant.

In prior art attempts to acid fracture sandstone formations, because the acid tends to react quickly with the fracture face, there is a good chance that opposing fracturing faces match up and narrow the flow paths when fracturing pressure is released. As described earlier, in cases where a partial monolayer of proppant is present, the created disparities in the flow paths caused by the fast reaction between the acid and the fracture face result in a smaller, narrower fracture width if the propping particles are embedded in the fracture faces that been etched by the acid, as shown in FIG. 1. The narrower flow channels result in reduced production from the sandstone formation. In contrast, the present invention delays production of the acid so that it is produced in situ, which allows for optimal placement of the partial monolayers of proppant, as shown in FIG. 2, and creates favorable fracture surface etching in the acid fracturing of the sandstone formation so that enlarged flow channels are generated.

Figure 2:
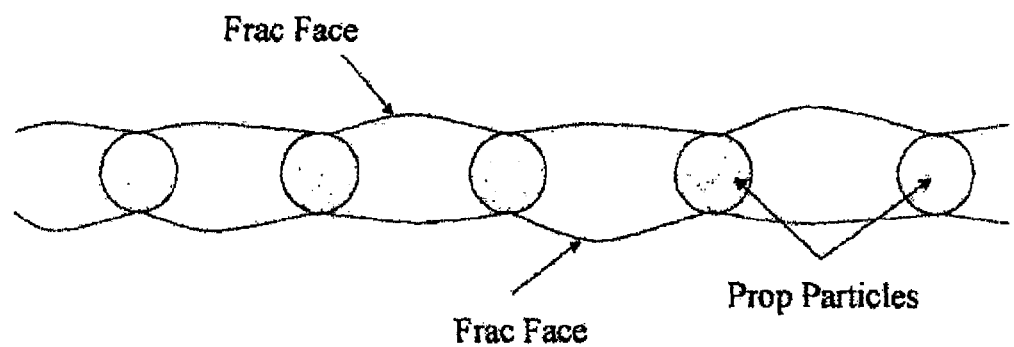
FIG. 2 illustrates the placement of proppant material in formations in accordance with an embodiment of the present invention.

In another aspect, as shown in FIG. 2, the proppant is optimally situated in the fractures in a partial monolayer before the acid forms. If a partial monolayer of propping material is present, it will conform to the fracture faces. Because of the slow reaction rate and the inert nature of the propping material, the reaction between the generated acid with the "spots" on the fracture faces that are contacted by proppants is prohibited. On the other hand, the slowly generated acid will react with the "spots" on the fracture faces that are not contacted by proppants. Therefore, not only enlarged flow channels are generated, but also the opposing fracturing faces will not match up when fracturing pressure is released due to the presence of the optimally placed partial monolayers of propping materials and controlled surface etching.

Generating hydrofluoric acid in situ makes it possible to perform acid fracturing of sandstone formations with the assistance of partial monolayers of effectively placed propping agents and create enlarged propped fractures. Increased fracture width will lead to higher fracture conductivity and enhanced hydrocarbon production than what is generally achieved from a conventional propped fracturing treatment.

In an aspect, the proppant can be any proppant material that is compatible with the other components contained within embodiments of the present invention. For example, the proppant can be selected from ceramics, resin coated ceramics, glass microspheres, sintered bauxite, resin-coated sintered bauxite, aluminum pellets, aluminum needles, nylon pellets, ground or crushed shells of nuts, seed shells crushed fruit pits, processed wood materials, or combinations thereof. Other suitable proppant materials will be apparent to those of skill in the art and are to be considered within the scope of the present invention.

In an aspect, the acid fracturing fluid is a stable oil-in-water emulsion. When pumping the composition of the present invention downhole, the ester emulsion system will not be reactive initially until the ester starts to hydrolyze and produce acid in-situ after a period of shut-in time. The shut-in time can range from about 1 hour to about 48 hours; or alternatively, about 3-about 24 hours. The acid that is produced in-situ will react with the fluoride salt to generate hydrofluoric acid, which then will react with the sandstone fracture faces.

The typical ester is an organic chemical that is generally not miscible with water. In order to pump the chemical into the well, either pure chemical or a solution of the chemical in an organic solvent has to be used, which usually requires a large volume of the chemical or organic solvent, which can cause on-site delivery difficulties, environmental concerns, increased costs, and the like. By advantageously using the oil-in-water emulsion of the present invention that is possible through the use of a sulfonate ester, many of the problems are eliminated.

In an aspect, the sulfonate ester has the following general structure:

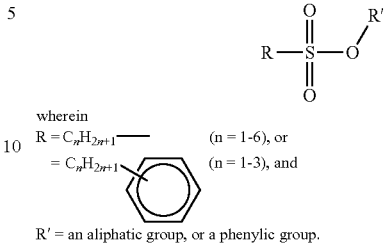

wherein
$R = C_nH_{2n+1}-$ ($n = 1\text{-}6$), or
$= C_nH_{2n+1}-\bigcirc-$ ($n = 1\text{-}3$), and $R'$ = an aliphatic group, or a phenylic group.

In embodiments of the present invention, the sulfonate ester is methyl p-toluenesulfonate, ethyl p-toluenesulfonate, methyl o-toluenesulfonate, ethyl o-toluenesulfonate, methyl m-toluenesulfonate, ethyl m-toluenesulfonate, methyl methanesulfonate, ethyl methanesulfonate, or combinations thereof. Other suitable sulfonate esters will be apparent to those of skill in the art and are to be considered within the scope of the present invention.

In an aspect, the fluoride salts of the present invention can have the following general formula: $M_1F$, wherein $M_1=NH_4^+$, $K^+$, $Na^+$, $Li^+$, $Rb^+$, or $Cs^+$. The fluoride salt can also be a bifluoride salt. The bifluoride salts of the present invention can have the following general formula: $M_2(HF_2)$, wherein $M_2=NH_4^+$, $K^+$, $Na^+$, $Li^+$, $Rb^+$, or $Cs^+$. In an aspect, the fluoride salt is ammonium fluoride, potassium fluoride, sodium fluoride, lithium fluoride, rubidium fluoride, cesium fluoride, or combinations thereof. As previously indicated, in an aspect, the fluoride salt can be a bifluoride salt. The bifluoride salt can be ammonium bifluoride, potassium bifluoride, sodium bifluoride, lithium bifluoride, rubidium bifluoride, cesium bifluoride, or combinations thereof. Other suitable fluoride salts will be apparent to those of skill in the art and are to be considered within the scope of the present invention.

In various aspects of the present invention, the acid fracturing fluid comprises about 1 vol. % to about 20 vol. % sulfonate ester, about 1 pound-400 pounds fluoride salt per 1000 gallons acid fracturing fluid, partial monolayers of proppant (20/40 mesh) at a loading of about 0.01 lb/ft²-about 0.4 lb/ft², and about 60 vol. %-about 99 vol. % water. Alternatively, the acid fracturing fluid comprises about 10 vol. % sulfonate ester, about 200 pounds fluoride salt per 1000 gallons acid fracturing fluid, partial monolayers of proppant (20/40 mesh) at a loading of about 0.01 lb/ft²-about 0.4 lb/ft², and about 80 vol. % water.

The methods and compositions of the present invention can also include various other additives that are useful in fracturing fluids, as long as they are compatible with the other components contained within the compositions and do not interfere with the delayed reaction functions of the compositions described herein. For example, the acid fracturing fluid can also include scale inhibitors and corrosion inhibitors. In an aspect, the acid fracturing fluid further comprises about 1 vol. % to about 6 vol. % 1-hydroxyethylidene-1,1-diphosphonic acid; or alternatively, about 1.5 vol. % to about 3 vol. % 1-hydroxyethylidene-1,1-diphosphonic acid. Besides the scale and corrosion inhibitors, other additives that can be used in the present invention include a fine stabilizing agent, a surfactant, or combinations thereof. Other suitable additives that can be used in the present invention will be apparent to those of skill in the art and are to be considered within the scope of the present invention.

As another embodiment of the present invention, a method for stimulating a sandstone formation penetrated by a well with an oil-in-water emulsion is provided. In this embodiment, the method includes introducing into the well the oil-in-water emulsion that, subsequent to introduction into the well, produces hydrofluoric acid in-situ in the formation. The oil-in-water emulsion comprises a sulfonate ester, a fluoride salt, a proppant, and water.

As another embodiment of the present invention, a stable oil-in-water emulsion acid fracturing fluid composition is provided. Similar to other embodiments described herein, the acid fracturing fluid composition comprises about 1 vol. % to about 20 vol. % sulfonate ester, about 1 pound-about 400 pounds fluoride salt per 1000 gallons fracturing fluid, partial monolayers of proppant (20/40 mesh) at a loading of about 0.01 lb/ft$^2$-about 0.4 lb/ft$^2$, and about 60 vol. % to about 99 vol. % water. In an aspect, the composition further includes about 1 vol. % to about 6 vol. % 1-hydroxyethylidene-1,1-diphosphonic acid. In another aspect, the composition comprises about 1 vol. % to about 20 vol. % sulfonate ester, about 200 pounds fluoride salt per 1000 gallons acid fracturing fluid, partial monolayers of proppant (20/40 mesh) at a loading of about 0.01 lb/ft$^2$-about 0.4 lb/ft$^2$, and about 60 wt % to about 99 vol. % water.

The methods and compositions described herein can be used in various temperature ranges. For example, the methods and compositions described herein can be used in a temperature range of from about 120° F. to about 400° F.

As an advantage of the present invention, because the acid is produced in situ, as opposed to being present the entire time of the acid fracturing application, corrosion is reduced during the fracturing application. As another advantage, deeper penetration of the acid fracturing fluid is possible using the same amount of ester emulsion when compared with using the same amount of conventional acids.

EXAMPLES

The following examples are included to demonstrate the use of compositions in accordance with embodiments of the present invention. It should be appreciated by those of skill in the art that the techniques disclosed in the examples that follow represent techniques discovered by the inventors to function well in the practice of the invention. However, those of skill in the art should, in light of the present disclosure, appreciate that many changes can be made in the specific embodiments that are disclosed and still obtain a like or similar result without departing from the scope of the invention.

Example 1

Corrosion tests were performed at 170° F. under atmospheric pressure on 4"×4" carbon steel coupons in an agitated water bath. The metal coupons tested were N-80 carbon steel and QT-800 carbon steel coil tubing. Each metal test coupon was blasted with glass beads before and after the corrosion test to ensure a uniform and clean surface. After the coupons were cleaned and dried, they were weighed before and after the water bath in order to determine the corrosion rate during the test. Two control coupons of each of the tested steels (Test No. 1 and No. 2) were placed into the test solution for a total of 6 hours. The test solution was an emulsified ester solution that contained 5 vol. % methyl p-toluenesulfonate (commercially available from Sigma-Aldrich)+0.5 vol. % S-400 (an emulsifier commercially available from BJ Services Company) and the balance deionized water. Another coupon of each metal was tested by placing the coupons into the test fluid and after each hour, taking them out and washing them in soapy water and acetone before being reweighed. The test coupons were then placed into fresh treating solutions. After the 4-hour test reading, the coupons remained in the test fluids for 2 additional hours before being removed, cleaned, air-dried, and reweighed, i.e., no reading was taken at hour 5. The surfaces of the test coupons were examined under a microscope for pitting. The results of the corrosion tests are shown in Table 1.

TABLE 1

| Test No. | Metal Tested | Cumulative Exposure Time (hr) | Corrosion Rate (Lbs/Sq. Ft.) | Pitting Number |
|---|---|---|---|---|
| 1 | N-80 | 6 | 0.02040 | trace |
| 2 | QT-800 | 6 | 0.03060 | trace |
| 3 | N-80 | 1 | 0.00230 | 0 |
| 4 | N-80 | 2 | 0.00356 | 0 |
| 5 | N-80 | 3 | 0.00470 | 0 |
| 6 | N-80 | 4 | 0.00580 | 0 |
| 7 | N-80 | 6 | 0.00970 | 0 |
| 8 | QT-800 | 1 | 0.00250 | 0 |
| 9 | QT-800 | 2 | 0.00364 | 0 |
| 10 | QT-800 | 3 | 0.00523 | 0 |
| 11 | QT-800 | 4 | 0.00651 | 0 |
| 12 | QT-800 | 6 | 0.00868 | 0 |

The pitting was evaluated using the following pitting scale, which is used for all of the examples described herein:

0=no pitting, staining or surface irregularities;

0-trace=slight staining of surface, but no surface irregularities;

trace=a trace amount of pitting on surface;

1=slightly more than a trace amount of pitting on surface;

2=a small amount of pitting on the surface;

3=a medium amount of pitting on the surface;

4=a large amount of pitting on the surface; and

5=large holes or very deep pits anywhere on the test coupon.

As can be seen in Table 1, the corrosion rate of the N-80 and QT-800 carbon steel coupons was much lower when the test fluid was replaced each hour, which simulates pumping new fluid through the tubing.

Example 2

Low rock solubility is an issue that has limited the ability to efficiently fracture sandstone formations. A solubility test was performed to determine the effectiveness of the compositions of the present invention in dissolving sandstone formation material. The sulfonate ester-containing composition was prepared by adding 9.6 g of ammonium bifluoride to 178 ml of water while stirring to prepare a solution. Then 2 mL S-400, which is an emulsifier commercially available from BJ Services Company, was added to the solution under strong agitation. After 30 seconds, 20.4 ml of methyl toluenesulfonate was added to obtain an emulsion system.

Once the emulsion was prepared, 4.22 g of ground Ohio sandstone powder was added to 100 ml of the prepared emulsion system. The combined sandstone powder and emulsion were kept in an oven at 180° F. for 24 hours. Once the combined sandstone powder and emulsion were removed from the oven, any remaining solids were separated from the liquid, washed, and dried. The weight of the remaining solids was 2.94 grams, which equates to a solubility of 30.3%. The results of this test demonstrate the effectiveness of the ester emulsion at dissolving sandstone formation material.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations can be applied to the compositions and/or methods and in the steps or in the sequence of steps of the methods described herein without departing from the concept, spirit and scope of the invention. More specifically, it will be apparent that certain agents that are chemically related can be substituted for the agents described herein while the same or similar results would be achieved. All such similar substitutes and modifications apparent to those skilled in the art are deemed to be within the scope and concept of the invention.

What is claimed is:

1. A method of acid fracturing a subterranean sandstone formation of a well to stimulate production of hydrocarbons, the method comprising the steps of: (1) injecting into the formation an acid fracturing fluid at a pressure sufficient to form fractures within the formation, the acid fracturing fluid comprising a sulfonate ester, a fluoride salt, a proppant, and water, the sulfonate ester being hydrolyzed to produce sulfonic acid; and (2) producing hydrofluoric acid in situ in the formation by reacting the sulfonic acid with the fluoride salt subsequent to injection of the acid fracturing fluid into the formation.

2. The method of claim 1, wherein the acid fracturing fluid is a stable oil-in-water emulsion.

3. The method of claim 1, wherein the sulfonate ester comprises methyl p-toluenesulfonate, ethyl p-toluenesulfonate, methyl o-toluenesulfonate, ethyl o-toluenesulfonate, methyl m-toluenesulfonate, ethyl m-toluenesulfonate, methyl methanesulfonate, ethyl methanesulfonate, or combinations thereof.

4. The method of claim 1, wherein the fluoride salt comprises ammonium fluoride, ammonium bifluoride, potassium fluoride, potassium bifluoride, sodium fluoride, sodium bifluoride, lithium fluoride, lithium bifluoride, rubidium fluoride, rubidium bifluoride, cesium fluoride, cesium bifluoride, or combinations thereof.

5. The method of claim 1, further comprising prohibiting the hydrofluoric acid from contacting spots on the fractures that are in contact with the proppant.

6. The method of claim 1, wherein the proppant is situated in the fractures in partial monolayers.

7. The method of claim 1, wherein the acid fracturing fluid further comprises a corrosion inhibitor, a scale inhibitor, a fine stabilizing agent, an emulsifier, or combinations thereof.

8. The method of claim 1, wherein the acid fracturing fluid comprises about 1 vol. % to about 20 vol. % sulfonate ester, about 1 pound to about 400 pounds fluoride salt per 1000 gallons acid fracturing fluid, partial monolayers of proppant at a loading of about 0.01 lb/ft$^2$ to about 0.4 lb/ft$^2$, and about 60 vol. % to about 99 vol. % water.

9. The method of claim 1, wherein the acid fracturing fluid further comprises about 1 vol. % to about 6 vol. % 1-hydroxyethylidene-1,1-diphosphonic acid.

10. A method for stimulating a sandstone formation penetrated by a well with an oil-in-water emulsion, the method comprising introducing into the well the oil-in-water emulsion that, subsequent to introduction into the well, produces hydrofluoric acid in-situ in the formation and further wherein the oil-in-water emulsion comprises a sulfonate ester, a fluoride salt, a proppant, and water.

11. The method of claim 10, wherein the sulfonate ester comprises methyl p-toluenesulfonate, ethyl p-toluenesulfonate, methyl o-toluenesulfonate, ethyl o-toluenesulfonate, methyl m-toluenesulfonate, ethyl m-toluenesulfonate, methyl methanesulfonate, ethyl methanesulfonate, or combinations thereof.

12. The method of claim 10, wherein the fluoride salt comprises ammonium fluoride, ammonium bifluoride, potassium fluoride, potassium bifluoride, sodium fluoride, sodium bifluoride, lithium fluoride, lithium bifluoride, rubidium fluoride, rubidium bifluoride, cesium fluoride, cesium bifluoride, or combinations thereof.

13. The method of claim 10, wherein the acid fracturing fluid further comprises a corrosion inhibitor, a scale inhibitor, a fine stabilizing agent, an emulsifier, or combinations thereof.

14. The method of claim 10, wherein the acid fracturing fluid comprises about 1 vol. % to about 20 vol. % sulfonate ester, about 1 pound to about 400 pounds fluoride salt per 1000 gallons acid fracturing fluid, partial monolayers of proppant at a loading of about 0.01 lb/ft$^2$-about 0.4 lb/ft$^2$, and about 60 vol. % to about 99 vol. % water.

15. The method of claim 10, wherein the acid fracturing fluid further comprises about 1 vol. % to about 6 vol. % 1-hydroxyethylidene-1,1-diphosphonic acid.

16. The method of claim 10, wherein the proppant is situated in the fractures in partial monolayers.

17. The method of claim 10, further comprising prohibiting the hydrofluoric acid from contacting spots on the fractures that are in contact with the proppant.

18. A stable oil-in-water emulsion acid fracturing fluid composition comprising about 1 vol. % to about 20 vol. % sulfonate ester, about 1 pound to about 400 pounds fluoride salt per 1000 gallons acid fracturing fluid, partial monolayers of proppant at a loading of about 0.01 lb/ft2 to about 0.4 lb/ft2, and about 60 vol. % to about 99 vol. % water.

19. The composition of claim 18 further comprising about 1 vol. % to about 6 vol. % 1-hydroxyethylidene-1,1-diphosphonic acid.

20. The composition of claim 18, wherein the wherein the sulfonate ester comprises methyl p-toluenesulfonate, ethyl p-toluenesulfonate, methyl o-toluenesulfonate, ethyl o-toluenesulfonate, methyl m-toluenesulfonate, ethyl m-toluenesulfonate, methyl methanesulfonate, ethyl methanesulfonate, or combinations thereof and the fluoride salt comprises ammonium fluoride, ammonium bifluoride, potassium fluoride, potassium bifluoride, sodium fluoride, sodium bifluoride, lithium fluoride, lithium bifluoride, rubidium fluoride, rubidium bifluoride, cesium fluoride, cesium bifluoride, or combinations thereof.

* * * * *